US007290793B2

(12) United States Patent
Tracht

(10) Patent No.: US 7,290,793 B2
(45) Date of Patent: Nov. 6, 2007

(54) VEHICLE SEAT ASSEMBLY WITH INFLATABLE AIR BAG

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 246 days.

(21) Appl. No.: 10/904,854

(22) Filed: Dec. 1, 2004

(65) Prior Publication Data

US 2006/0113769 A1    Jun. 1, 2006

(51) Int. Cl.
*B60R 21/20* (2006.01)
(52) U.S. Cl. .................. 280/730.2; 280/728.3
(58) Field of Classification Search ............ 280/728.3, 280/730.2, 728.1
See application file for complete search history.

(56) References Cited

U.S. PATENT DOCUMENTS

| 5,498,030 | A |   | 3/1996  | Hill et al.           |
|-----------|---|---|---------|-----------------------|
| 5,645,295 | A | * | 7/1997  | White et al. ...... 280/730.2 |
| 5,678,853 | A |   | 10/1997 | Maly                  |
| 5,749,597 | A |   | 5/1998  | Saderholm             |
| 5,762,363 | A |   | 6/1998  | Brown et al.          |
| 5,810,389 | A |   | 9/1998  | Yamaji et al.         |
| 5,816,610 | A |   | 10/1998 | Higashiura et al.     |
| 5,860,673 | A |   | 1/1999  | Hasegawa et al.       |
| 5,863,063 | A |   | 1/1999  | Harrell               |
| 5,899,528 | A |   | 5/1999  | Rumpf et al.          |
| 5,927,749 | A |   | 7/1999  | Homier et al.         |
| 5,938,232 | A |   | 8/1999  | Kalandek et al.       |
| 5,967,603 | A |   | 10/1999 | Genders et al.        |
| 6,045,151 | A |   | 4/2000  | Wu                    |
| 6,050,636 | A | * | 4/2000  | Chevallier et al. ..... 297/216.13 |
| 6,206,410 | B1|   | 3/2001  | Brown                 |
| 6,237,934 | B1|   | 5/2001  | Harrell et al.        |
| 6,352,304 | B1|   | 3/2002  | Sorgenfrei            |
| 6,588,838 | B1|   | 7/2003  | Dick, Jr. et al.      |
| 7,134,685 | B2|   | 11/2006 | Panagos et al.        |
| 2006/0113752 | A1 | | 6/2006 | Tracht                |
| 2006/0113761 | A1 | | 6/2006 | Tracht                |
| 2006/0113767 | A1 | | 6/2006 | Tracht                |

(Continued)

FOREIGN PATENT DOCUMENTS

DE    103 07 480 A1    9/2004

(Continued)

OTHER PUBLICATIONS

U.S. Appl. No. 08/808,572, filed Feb. 28, 1997, Wu et al.

(Continued)

*Primary Examiner*—Eric Culbreth
(74) *Attorney, Agent, or Firm*—Brooks Kushman P.C.

(57) ABSTRACT

A vehicle seat assembly includes an inflatable air bag and a housing associated with the air bag. The housing includes first and second housing portions that are moveable away from each other upon inflation of the air bag, and the first and second housing portions have first and second receptacles, respectively. The assembly further includes a cover material overlaying the housing and having first and second sections that are connected together at a deployment seam through which the air bag is deployable. First and second retainers are connected to the first and second sections, respectively, and disposed in the first and second receptacles, respectively. Upon inflation of the air bag, the retainers are configured to facilitate deployment of the air bag through the deployment seam.

19 Claims, 2 Drawing Sheets

U.S. PATENT DOCUMENTS

2006/0113768 A1    6/2006    Tracht

FOREIGN PATENT DOCUMENTS

| DE | 10340508 | 3/2005 |
|----|----------|--------|
| EP | 0819587  | 1/1998 |
| FR | 2 806 685 A1 | 9/2001 |

OTHER PUBLICATIONS

Notice of Allowance, mailed Jun. 15, 2007 for U.S. Appl. No. 10/904,852, filed Dec. 1, 2004, Inventor: Michael L. Tracht, Publication No. 2006/0113767A1.

* cited by examiner

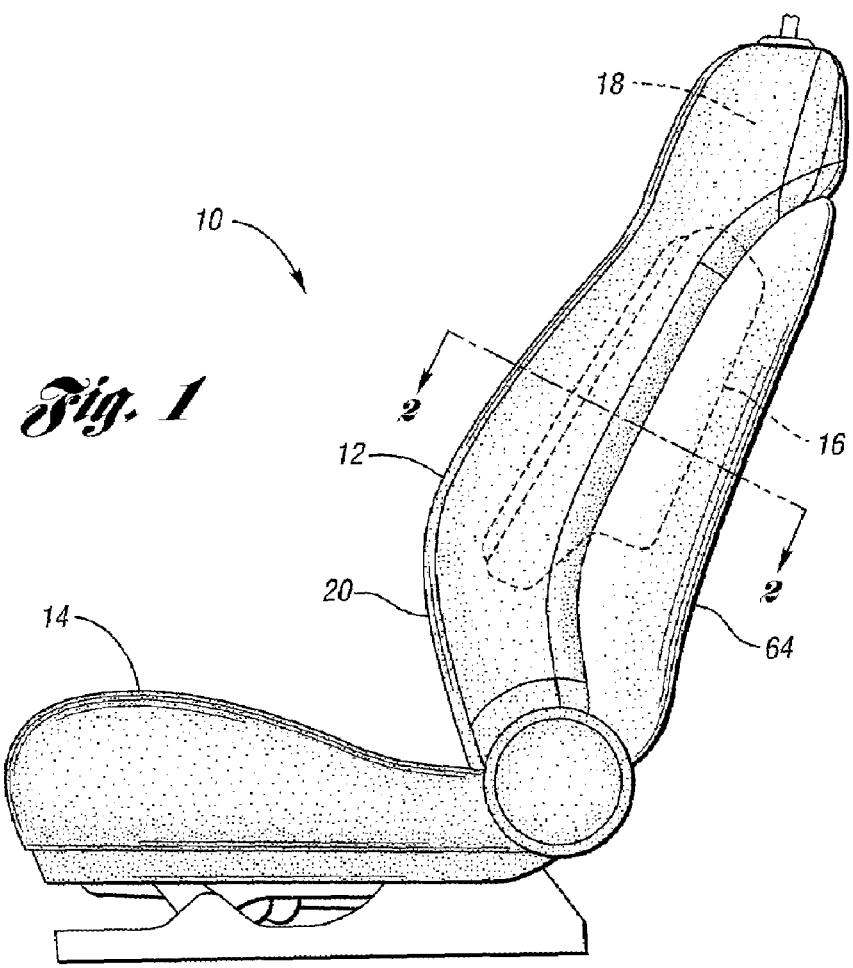
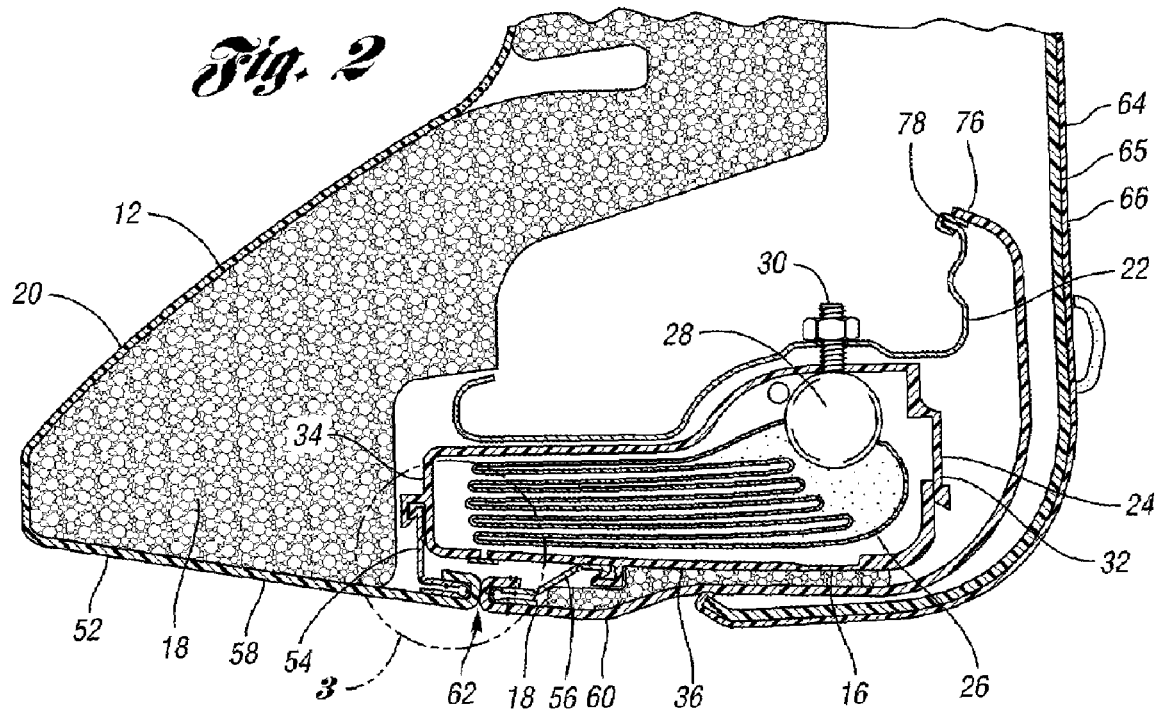

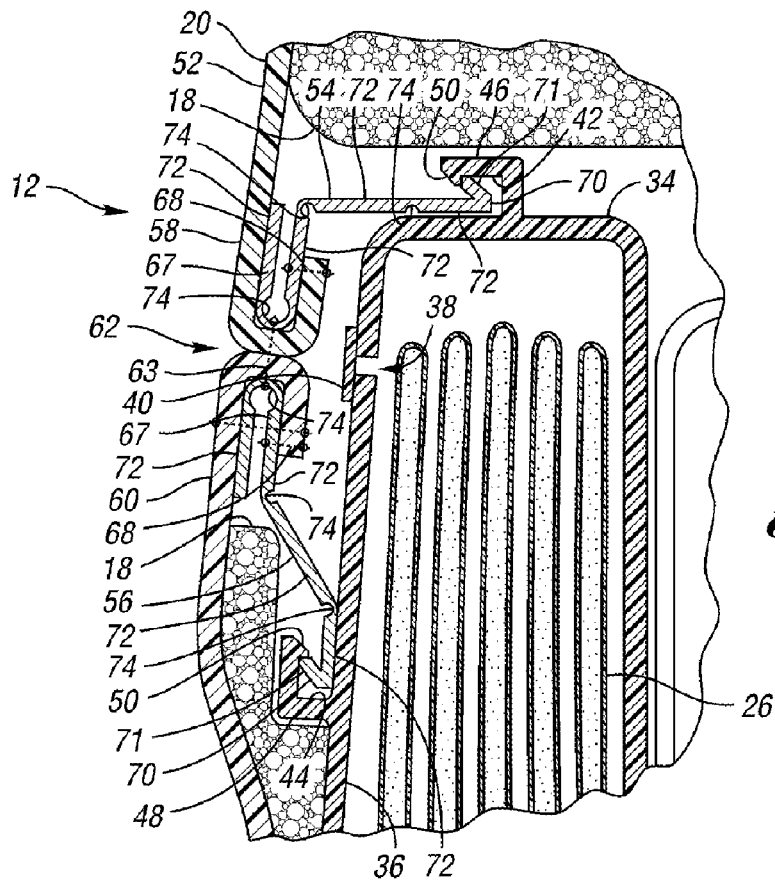
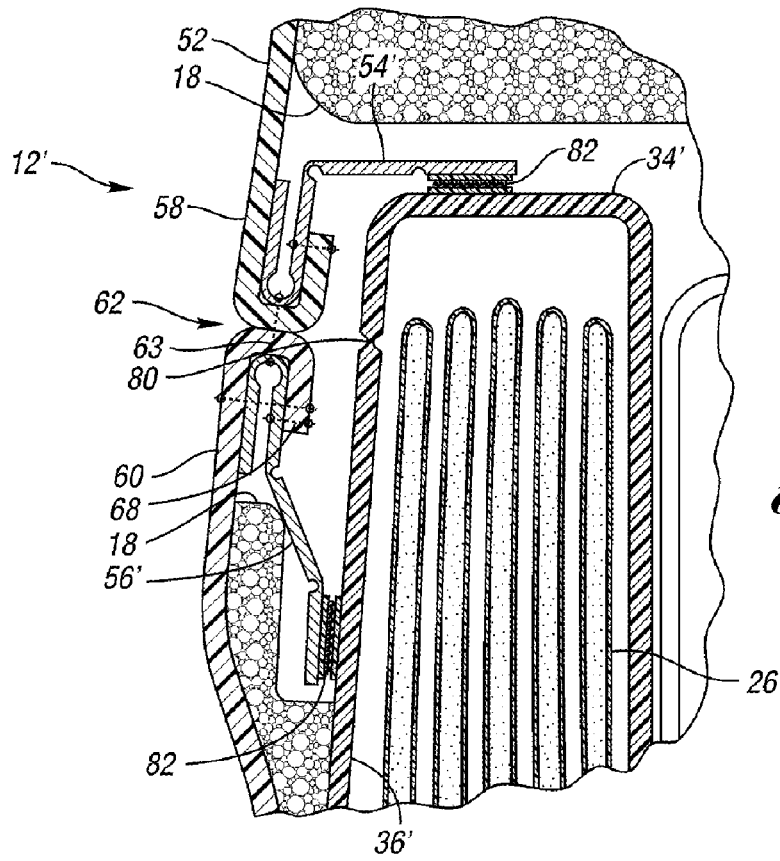

VEHICLE SEAT ASSEMBLY WITH INFLATABLE AIR BAG

BACKGROUND OF THE INVENTION

1. Field of the Invention

The invention relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY OF THE INVENTION

Under the invention, a vehicle seat assembly is provided. In one embodiment, the assembly includes an inflatable air bag and a housing associated with the air bag. The housing includes first and second housing portions that are moveable away from each other upon inflation of the air bag. In addition, the first and second housing portions have first and second receptacles, respectively. The assembly further includes a cover material overlaying the housing and having first and second sections that are connected together at a deployment seam through which the air bag is deployable. First and second retainers are connected to the first and second sections, respectively, and disposed in the first and second receptacles, respectively. Upon inflation of the air bag, the retainers are configured to facilitate deployment of the air bag through the deployment seam.

In another embodiment, the assembly includes an inflatable air bag and a housing associated with the air bag. The housing includes first and second housing portions that are moveable away from each other upon inflation of the air bag. The assembly further includes a cover material overlaying the housing and having first and second sections that define a deployment seam through which the air bag is deployable. First and second retainers are connected to the first and second sections, respectively, and the first and second housing portions, respectively. Furthermore, at least one of the retainers has a hinge for allowing movement of the cover material with respect to the housing. Upon inflation of the air bag, the retainers are configured to facilitate deployment of the air bag between the sections of the cover material.

Further under the invention, a method of manufacturing a vehicle seat assembly is provided. In one embodiment, the method includes the steps of attaching an air bag module to a seat frame, the air bag module including an inflatable air bag and a housing associated with the air bag, the housing including first and second housing portions; positioning a cover arrangement over the air bag module after the attaching step, the cover arrangement including a cover material having first and second sections that are connected together at a deployment seam through which the air bag is deployable, the cover arrangement further including first and second retainers connected to the first and second sections, respectively, of the cover material; and connecting the retainers to the housing portions.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side view of a vehicle seat assembly according to the invention and including an air bag module positioned in a seat back cushion assembly;

FIG. 2 is a fragmentary cross-sectional view of the seat back cushion assembly taken along line 2-2 of FIG. 1 and showing a housing of the air bag module connected to first and second sections of a cover material with first and second retainers;

FIG. 3 is an enlarged view of a portion of FIG. 2 showing the connection between the housing and the cover material; and FIG. 4 is an enlarged view similar to FIG. 3 of a second embodiment of the seat back cushion assembly.

DETAILED DESCRIPTION OF THE PREFERRED EMBODIMENT(S)

FIG. 1 shows a vehicle seat assembly 10 according to the invention for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as an air bag module 16, a seat cushion or pad 18 overlaying the air bag module 16, and a cover arrangement 20 overlaying the seat pad 18 and air bag module 16.

As shown in FIG. 2, the air bag module 16 may be disposed proximate one side of the seat back cushion assembly 12, such as an outboard lateral side or an inboard lateral side, and may be connected to a support member, such as seat back frame 22. Alternatively, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

Still referring to FIG. 2, the air bag module 16 includes a housing 24 that may substantially surround an inflatable air bag 26, and an inflator 28 connected to the air bag 26 for inflating the air bag 26. The inflator 28 may be connected to the frame 22, or other suitable support member, in any suitable manner, such as with one or more fasteners 30. The fasteners 30, which may each include a bolt and nut for example, may also be used to connect the housing 24 to the frame 22. Alternatively, the air bag module 16 may be connected to the frame 22, or other suitable support member, in any suitable manner.

The housing 24 has a body 32, such as a clam-shell body, that may comprise a relatively rigid molded plastic material, such as polypropylene. Alternatively, the body 32 may be made of any suitable material and in any suitable manner. Furthermore, the body 32 has first and second housing portions 34 and 36, respectively, that are moveable away from each other upon inflation of the air bag 26. Ends of the housing portions 34 and 36 may be spaced apart from each other, as shown in FIGS. 2 and 3, to define a deployment opening 38. The ends may also be connected together with a temporary fastener, such as a piece of tape 40. Alternatively, if desired, the housing portions 34 and 36 may be joined together in any suitable manner.

As further shown in FIG. 3, the first and second housing portions 34 and 36 may have first and second receptacles 42 and 44, respectively. In the embodiment shown in FIG. 3, the first and second receptacles 42 and 44, respectively, are defined by first and second projections 46 and 48, respectively, that each have a beveled surface 50.

Referring to FIGS. 2 and 3, the seat pad 18 may be disposed adjacent the air bag module 16 and the frame 22. In the embodiment shown in the Figures, a portion of the seat pad 18 is disposed between each housing portion 34 and 36 and the cover arrangement 20.

In at least one embodiment, the seat pad 18 is made from a molded polymeric material, such as a polyurethane foam. The use of a polymeric foam material to construct the seat pad 18 can be cost effective and can provide the flexibility needed to easily change the shape of the seat pad 18 for different vehicle seat configurations. Alternatively, the seat pad 18 may comprise any suitable material, and may be made in any suitable manner.

The cover arrangement 20 includes a cover material or trim cover 52 and first and second retainers 54 and 56, respectively, attached to the trim cover 52. The trim cover 52 may be made of any suitable material, such as cloth, vinyl or leather, and may be provided with or without a padding layer. Furthermore, the trim cover 52 may include multiple pieces that are joined together at seams. Referring to FIGS. 2 and 3, the trim cover 52 includes first and second sections 58 and 60, respectively, that are joined together at a deployment seam 62. For example, the sections 58 and 60 may be sewn together with stitching 63.

As is shown in FIGS. 1 and 2, in at least some embodiments, a relatively rigid panel 64 may also be provided in the rear area of the seat back cushion assembly 12 to provide support and/or for aesthetics. The panel 64 may include a main body 65, such as a plastic molding. In addition, the panel 64 may include a cover layer 66 made of any suitable material, such as cloth, leather or vinyl, attached to the main body 65.

The first and second retainers 54 and 56, respectively, are connected in any suitable manner to the first and second sections 58 and 60, respectively, of the trim cover 52. For example, the retainers 54 and 56 may be sewn, tacked, glued, or sonically welded to the sections 58 and 60. In the embodiment shown in FIG. 3, for example, each retainer 54 and 56 has a first end 67 that is sewn to a respective trim cover section 58, 60 with stitching 68 and/or 63 such that the first ends 67 are each sandwiched between two portions of a respective trim cover section 58, 60.

Furthermore, the first and second retainers 54 and 56, respectively, are disposable in the first and second receptacles 42 and 44, respectively, to connect the trim cover 52 to the housing 24. In the embodiment shown in FIG. 3, for example, each retainer 54 and 56 has a second end 70 that is configured to be snap-fit into a respective receptacle 42 or 44. Each second end 70 may also have a beveled surface 71 that is engageable with a beveled surface 50 of a respective housing portion 34, 36 to facilitate insertion of the second ends 70 into the receptacles 42 and 44.

Each retainer 54 and 56 may also have multiple relatively rigid portions 72 and multiple relatively flexible hinge portions 74 that are each disposed between adjacent rigid portions 72 for allowing movement of one rigid portion 72 with respect to another rigid portion 72. With such a configuration, the retainers 54 and 56 may allow the trim cover 52 to move with respect to the air bag module 16. As a result, the trim cover 52 may be spaced away from the housing 24 to provide the seat back cushion assembly 12 with a soft feel proximate the deployment seam 62. As shown in FIG. 3, a portion of the seat pad 18 may also extend between the trim cover 52 and the housing 24 to further improve the soft feel.

The retainers 54 and 56 may comprise any suitable material and may be made in any suitable manner. For example, the retainers 54 and 56 may be made of molded plastic, such as nylon, polypropylene, or polyethylene.

Referring to FIGS. 1 through 3, to assemble the vehicle seat assembly 10, the air bag module 16 may be connected to the frame 22 with the fasteners 30. Next, the seat pad 18 may positioned about the air bag module 16 and frame 22, and attached to the air bag module 16 and/or frame 22. The trim cover 52 with the retainers 54 and 56 already attached thereto, and with the sections 58 and 60 connected together at the deployment seam 62, may then be placed over the seat pad 18, and the retainers 54 and 56 may be snapped or otherwise inserted into the receptacles 42 and 44. Next, a free end 76 of the trim cover section 60 may be connected to the frame 22 in any suitable manner, such as with a clip 78. The panel 64 may then be attached to the frame 22, or other suitable support member, in any suitable manner.

When the air bag 26 is inflated by the inflator 28, the air bag 26 causes the first and second housing portions 34 and 36, respectively, of the housing 18 to move away from each other. Continued inflation of the air bag 26 causes the deployment seam 62 to rupture, thereby allowing the air bag 26 to deploy between the sections 58 and 60 of the trim cover 52.

The retainers 54 and 56 may function to facilitate deployment of the air bag 26 in one or more ways. For example, the retainers 54 and 56 may ensure proper alignment between the air bag module 16 and the deployment seam 62. As another example, when the housing portions 34 and 36 move away from each other upon inflation of the air bag 26, the retainers 54 and 56 may be urged to move away from each other and thereby apply an initial separation force on the deployment seam 62. As yet another example, the retainers 54 and 56 may guide the air bag 26 toward the deployment seam 62. As still yet another example, the retainers 54 and 56 may inhibit or prevent contact between the air bag 26 and the seat pad 18 during deployment of the air bag 26. This can help to reduce energy loss from the air bag 26 by decreasing friction. This, in turn, can also help to reduce the deployment time for the air bag 26 and/or the amount of inflation fluid required to deploy the air bag 26.

Referring to FIG. 4, a second embodiment 12' of the seat back cushion assembly is shown. The seat back cushion assembly 12' includes an alternative connection between housing portions 34' and 36', and an alternative connection between each retainer 54' and 56' and a respective housing portion 34', 36'. Specifically, the housing portions 34' and 36' shown in FIG. 4 are connected together with a frangible groove or seam 80 that is configured to rupture upon inflation of air bag 26. In addition, the retainers 54' and 56' are connected to the housing portions 34' and 36' with hook and loop fasteners 82.

While exemplary embodiments in accordance with the invention are illustrated and disclosed, such disclosure should not be construed to limit the claims. It is anticipated that various modifications and alternative designs may be made without departing from the scope of the invention. For example, retainers according to the invention may be connected to respective housing portions in any suitable manner. Furthermore, any of the features described above may be selectively combined with any of the above described embodiments.

What is claimed is:

1. A vehicle seat assembly comprising:
   an inflatable air bag;
   a housing associated with the air bag, the housing having first and second housing portions that are configured to allow relative movement therebetween upon inflation of the air bag, the first and second housing portions having first and second receptacles, respectively;
   a cover material overlaying the housing, the cover material having first and second sections that are connected together at a deployment seam through which the air bag is deployable, wherein the deployment seam defines an exterior seam of the cover material; and
   first and second retainers connected to the first and second sections, respectively, and disposed in the first and second receptacles, respectively;
   wherein upon inflation of the air bag, the retainers are configured to facilitate deployment of the air bag through the deployment seam.

2. The assembly of claim 1 wherein the cover material, proximate the deployment seam, is spaced away from the housing.

3. The assembly of claim 1 wherein at least one of the retainers has a hinge for allowing movement of the cover material with respect to the housing.

4. The assembly of claim 1 wherein one of the retainers has two relatively rigid portions separated by a relatively flexible hinge that allows one rigid portion to move with respect to the other rigid portion.

5. The assembly of claim 4 wherein the retainers comprise plastic.

6. The assembly of claim 1 wherein each retainer has multiple hinge portions for allowing movement of the cover material with respect to the housing.

7. The assembly of claim 1 wherein the first and second retainers are connected to the first and second sections, respectively, of the cover material such that each retainer is sandwiched between and engaged with two portions of a respective cover material section.

8. The assembly of claim 1 wherein ends of the housing portions are spaced apart to define a deployment opening for the air bag.

9. The assembly of claim 8 wherein the ends of the housing portions are connected together by a temporary fastener.

10. A vehicle seat assembly comprising:
    an inflatable air bag;
    a housing associated with the air bag, the housing having first and second housing portions that B1 upon inflation of the air bag;
    a cover material overlaying the housing, the cover material having first and second sections that define a deployment seam through which the air bag is deployable; and
    first and second retainers connected to the first and second sections, respectively, and the first and second housing portions, respectively, at least one of the retainers having a hinge for allowing movement of the cover material with respect to the housing;
    wherein upon inflation of the air bag, the retainers are configured to facilitate deployment of the air bag between the sections of the cover material.

11. The assembly of claim 10 wherein the retainers are connected to the housing portions with hook and loop fasteners.

12. The assembly of claim 10 wherein each retainer has multiple hinges for allowing movement of the cover material with respect to the housing.

13. The assembly of claim 10 wherein the sections of the cover material are connected together at the deployment seam.

14. The assembly of claim 10 wherein the cover material is spaced away from the housing.

15. A method of manufacturing a vehicle seat assembly, the method comprising:
    attaching an air bag module to a seat frame, the air bag module including an inflatable air bag and a housing associated with the air bag, the housing including first and second housing portions;
    positioning a cover arrangement over the air bag module after the attaching step, the cover arrangement including a cover material having first and second sections that are connected together at a deployment seam through which the air bag is deployable, the cover arrangement further including first and second retainers connected to the first and second sections, respectively, of the cover material; and
    connecting the retainers to the housing portions,
    wherein at least one of the retainers has a hinge for allowing movement of the cover material with respect to the housing after the connecting step.

16. The method of claim 15 wherein the first and second housing portions have first and second receptacles, respectively, and wherein the connecting step includes inserting the first and second retainers into the first and second receptacles, respectively.

17. The method of claim 15 wherein the connecting step includes connecting the retainers to the housing portions using hook and loop fasteners.

18. The method of claim 15 wherein the first and second sections of the cover material are sewn together at the deployment seam.

19. The method of claim 15 wherein the first and second retainers are connected to the first and second sections, respectively, of the cover material such that each retainer is sandwiched between and engaged with two portions of a respective cover material section.

* * * * *

UNITED STATES PATENT AND TRADEMARK OFFICE
CERTIFICATE OF CORRECTION

| | | |
|---|---|---|
| PATENT NO. | : 7,290,793 B2 | Page 1 of 1 |
| APPLICATION NO. | : 10/904854 | |
| DATED | : November 6, 2007 | |
| INVENTOR(S) | : Michael L. Tracht | |

It is certified that error appears in the above-identified patent and that said Letters Patent is hereby corrected as shown below:

Column 5, Line 49, Claim 10:

Delete "B1" and insert:

-- are configured to allow relative movement therebetween --.

Signed and Sealed this

Sixth Day of May, 2008

JON W. DUDAS
*Director of the United States Patent and Trademark Office*